(12) United States Patent
Kuczynski et al.

(10) Patent No.: US 8,750,704 B2
(45) Date of Patent: Jun. 10, 2014

(54) IMPLEMENTING REDUCED SIGNAL DEGRADATION FOR FIBER OPTIC MODULES

(75) Inventors: Joseph Kuczynski, Rochester, MN (US); Arvind Kumar Sinha, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/691,845

(22) Filed: Jan. 22, 2010

(65) Prior Publication Data

US 2011/0182575 A1    Jul. 28, 2011

(51) Int. Cl.
*H04B 10/08* (2011.01)
*G02B 1/06* (2006.01)
*G02B 27/64* (2006.01)

(52) U.S. Cl.
USPC ............... 398/28; 398/25; 398/9; 398/140; 398/158; 398/159

(58) Field of Classification Search
USPC .................... 398/158, 159, 140, 9, 25, 28
See application file for complete search history.

(56) References Cited

U.S. PATENT DOCUMENTS

| | | | | |
|---|---|---|---|---|
| 5,638,169 A * | 6/1997 | Hollmann et al. | ............ | 356/127 |
| 6,369,954 B1 * | 4/2002 | Berge et al. | ................... | 359/666 |
| 6,888,169 B2 * | 5/2005 | Malone et al. | ................... | 257/82 |
| 7,986,465 B1 * | 7/2011 | Lo et al. | ........................ | 359/666 |
| 2006/0210272 A1 * | 9/2006 | Shimizu | .......................... | 398/79 |
| 2007/0030573 A1 * | 2/2007 | Batchko et al. | ............... | 359/665 |

* cited by examiner

*Primary Examiner* — Oommen Jacob
(74) *Attorney, Agent, or Firm* — Joan Pennington

(57) ABSTRACT

A method and circuit are provided for implementing reduced signal degradation for fiber optic modules, and a design structure on which the subject circuit resides. Responsive to a detected signal input, an optical misalignment calculation is performed. A voltage potential for a lens shape control is selected responsive to the optical misalignment calculation. An optical signal loss calculation and threshold compare are performed. Responsive to the optical signal loss calculation less than the threshold, the lens shape and voltage potential are fixed. A fluidic lens provides variable lens shape responsive to the selected voltage potential being applied to the fluidic lens.

24 Claims, 9 Drawing Sheets

IMPLEMENTING REDUCED SIGNAL DEGRADATION FOR FIBER OPTIC MODULES

FIELD OF THE INVENTION

The present invention relates generally to the data communications field, and more particularly, relates to a method and circuit for implementing reduced signal degradation for fiber optic modules, and a design structure on which the subject circuit resides.

DESCRIPTION OF THE RELATED ART

Signal loss can result due to misalignment that occurs, for example, during the assembly process, when a fiber optic connector assembly is actuated onto an optics module, which directs the signal.

A need exists for an effective method and apparatus to reduce fiber optic signal loss in fiber optic modules.

SUMMARY OF THE INVENTION

A principal aspect of the present invention is to provide a method and circuit for implementing reduced signal degradation for fiber optic modules, and a design structure on which the subject circuit resides. Other important aspects of the present invention are to provide such method, circuitry, and design structure for implementing reduced signal degradation for fiber optic modules substantially without negative effect and that overcome many of the disadvantages of prior art arrangements.

In brief, a method and circuit are provided for implementing reduced signal degradation for fiber optic modules, and a design structure on which the subject circuit resides. Responsive to a detected signal input, an optical misalignment calculation is performed. A voltage potential for a lens shape control is selected responsive to the optical misalignment calculation. An optical signal loss calculation and threshold compare are performed. Responsive to the optical signal loss calculation less than the threshold, the lens shape and voltage potential are fixed.

In accordance with features of the invention, responsive to the optical signal loss calculation greater than the threshold, another detected signal input is applied for another optical misalignment calculation and the lens shape control operations are repeated.

In accordance with features of the invention, a photosensitive detector with an aperture is placed upon a semiconductor laser, such as a Vertical-Cavity Surface-Emitting Laser (VCSEL).

In accordance with features of the invention, a fluidic lens provides variable lens shape responsive to the selected voltage potential being applied to a pair of housing electrodes of the fluidic lens. A lens mechanism applies a corresponding electric field changing the shape of the lens responsive to the applied selected voltage potential.

In accordance with features of the invention, an array of fluidic lens is provided with a lens assembly including a lens array block. A plurality of piezoelectric crystals are mounted to the lens array block to control horizontal and vertical alignment (x-axis and y-axis) of respective fluidic lens.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In accordance with features of the invention, methods are provided using a fluidic lens for implementing reduced signal degradation for fiber optic modules. The shape of the fluidic lens is selectively changed by applying a selected voltage potential, altering the focal length of the lens.

Figure 1:
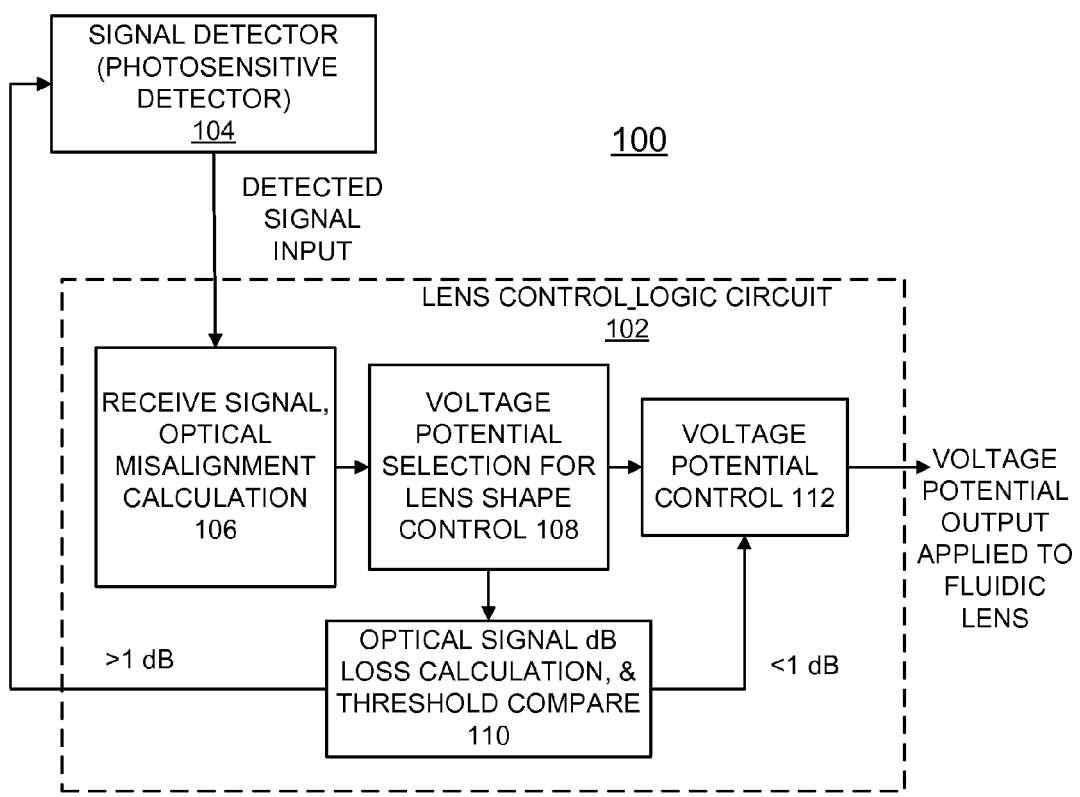
FIG. 1 is a schematic diagram of an example lens control circuit for implementing reduced signal degradation for fiber optic modules in accordance with the preferred embodiment.

Having reference now to the drawings, in FIG. 1, there is shown a lens control circuit generally designated by the reference character 100 in accordance with the preferred embodiment. Control circuit 100 includes a lens control logic circuit 102 coupled to a signal detector 104, such as a photo-sensitive detector. The lens control logic circuit includes an optical misalignment calculation block 106 receiving a detected signal input from the signal detector 104. The optical misalignment calculation block 106 provides an input to a voltage potential selection block 108 for providing a lens shape control. The voltage potential selection block 108 provides an input to an optical dB loss calculation and threshold compare 110 and to a voltage potential control 112. The optical dB loss calculation and threshold compare 110 provides a respective control input to the signal detector 104 and the voltage potential control 112. The voltage potential control 112 provides a control voltage potential output applied to a fluidic lens 302 of a fiber optic module.

Figure 2:
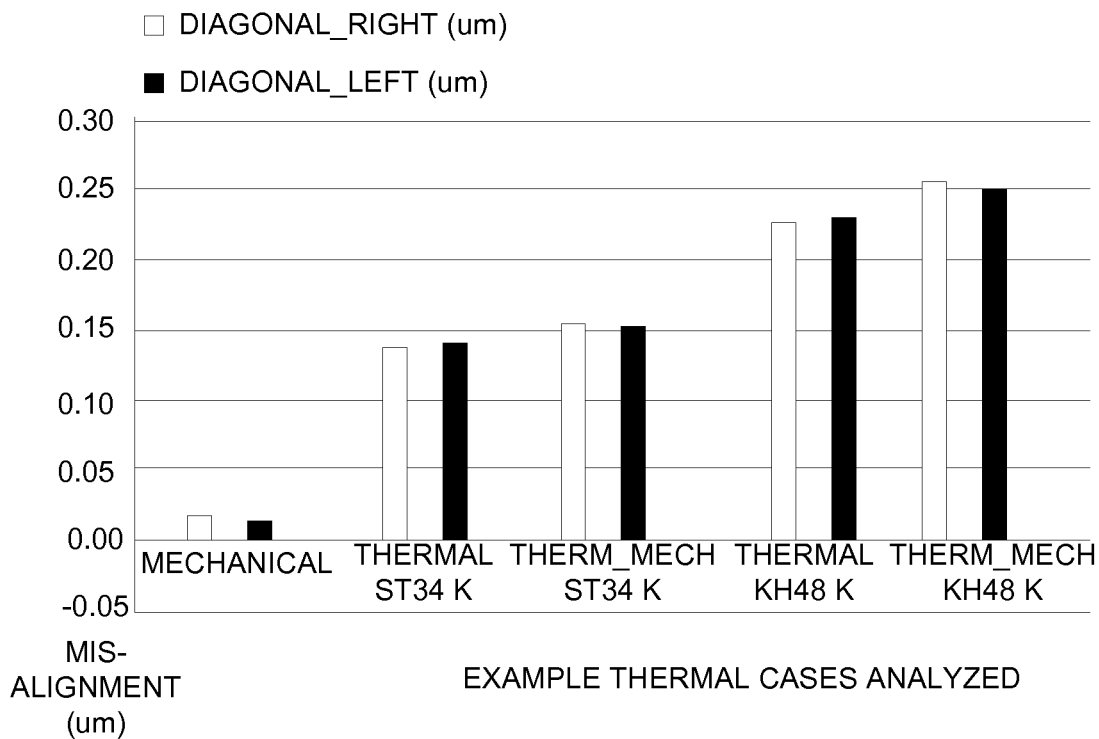
FIG. 2 is a chart illustrating thermal mechanical analysis of optical misalignment with optical misalignment shown with respect to the vertical axis, and example thermal cases analyzed with respect to the horizontal axis.

FIG. 2 illustrates thermal mechanical analysis of optical misalignment with optical misalignment shown with respect to the vertical axis, and example thermal cases analyzed with respect to the horizontal axis. Depending on the assembly, temperature and actuation, an optical misalignment of 0.25 um is projected. When this misalignment is coupled with the fiber pull spec of 3 lbs, a loss of 4 dB in signal degradation has been seen in the early prototype parts. To improve signal integrity a design incorporating a fluidic lens is provided, as further illustrated and described with respect to FIG. 3.

Figure 3:
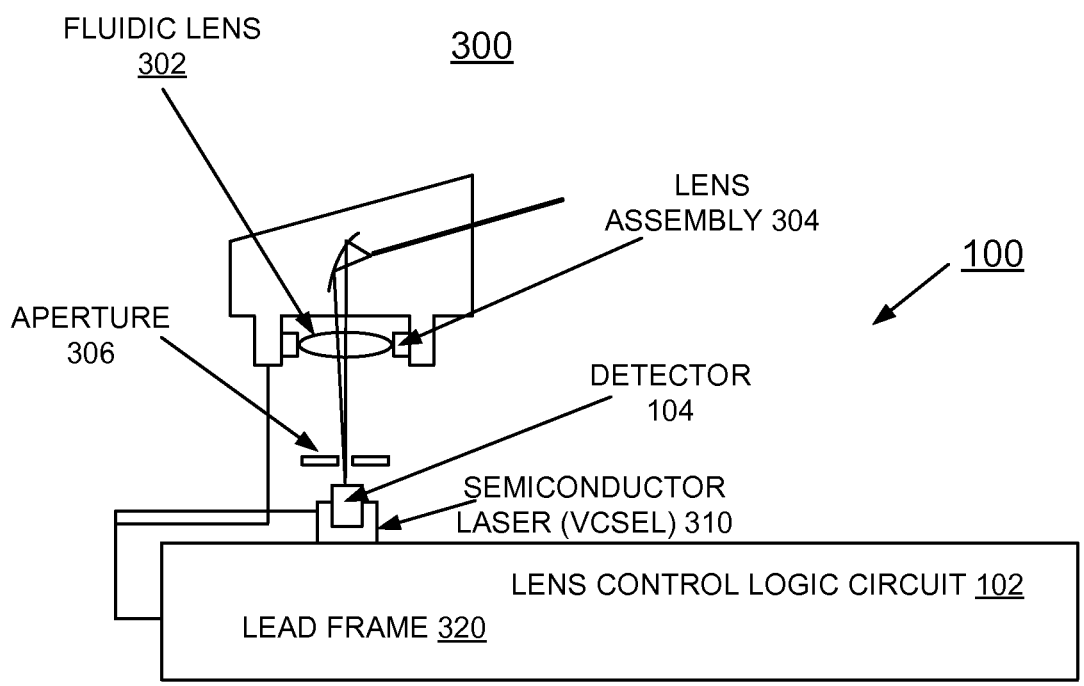
FIG. 3 is a schematic and block diagram representation of a fiber optic module assembly not to scale including the lens control circuit of FIG. 1 for implementing reduced signal degradation for the fiber optic modules in accordance with the preferred embodiment.

Referring also to FIG. 3, illustrates a fiber optic module assembly generally designated by the reference character 300 including the lens control circuit 100 of FIG. 1 for implementing reduced signal degradation for the fiber optic modules in accordance with the preferred embodiment. The voltage potential control 112 is coupled to a fluidic lens 302 of a lens assembly 304. The detector 104 includes an aperture 306, and is mounted upon a semiconductor laser 310, such as a Vertical-Cavity Surface-Emitting Laser (VCSEL). The detector 104 is coupled to the lens control logic circuit 102, which is contained within a lead frame 320, which supports the semiconductor laser or VCSEL 310.

Figure 4:
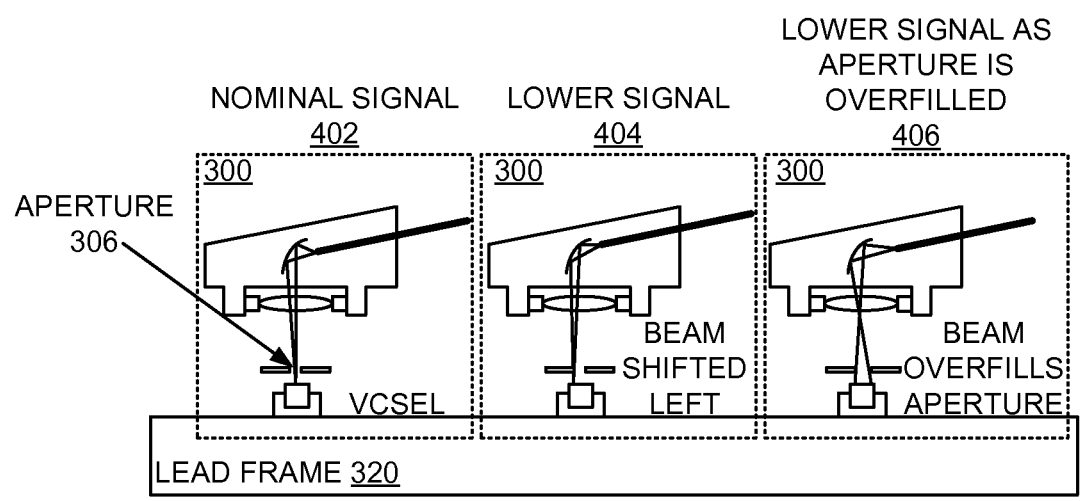
FIG. 4 is a schematic and block diagram representation of a plurality of fiber optic modules including a nominal signal with generally centered beam signal, a lower signal with a beam signal shifted left, and a lower signal with a beam signal overfilling an aperture.

FIG. 4 is a schematic and block diagram representation not to scale of a plurality of fiber optic modules 300 respectively illustrating a nominal signal 402 with a generally centered beam signal within the aperture 306, a lower signal 404 with a beam signal shifted left within the aperture 306, and a lower signal 406 with a beam signal overfilling the aperture 306.

Figure 5:
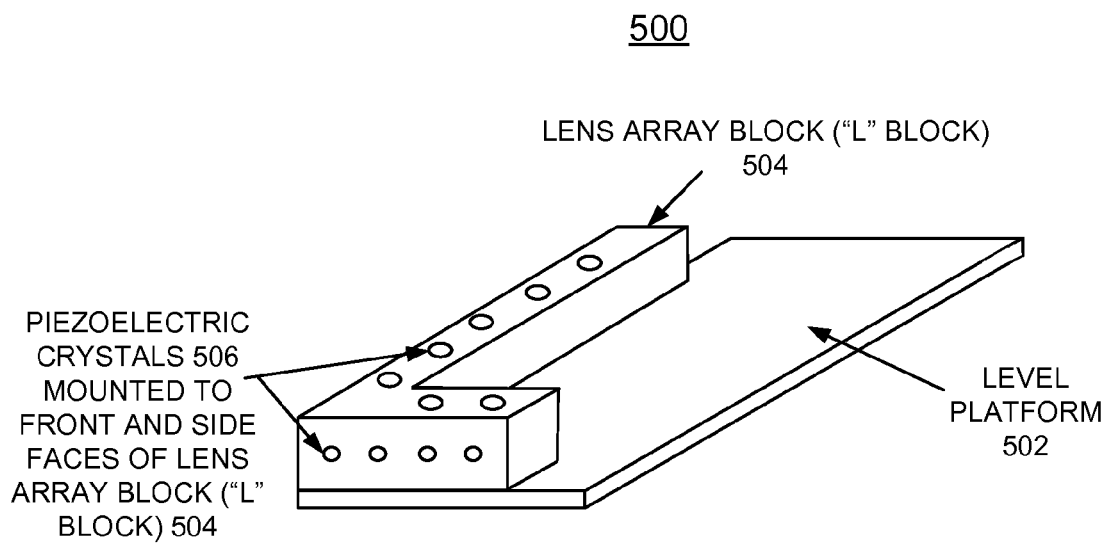
FIG. 5 schematically illustrates not to scale a lens array represented by an L-shaped block in accordance with the preferred embodiment.
Figure 6:
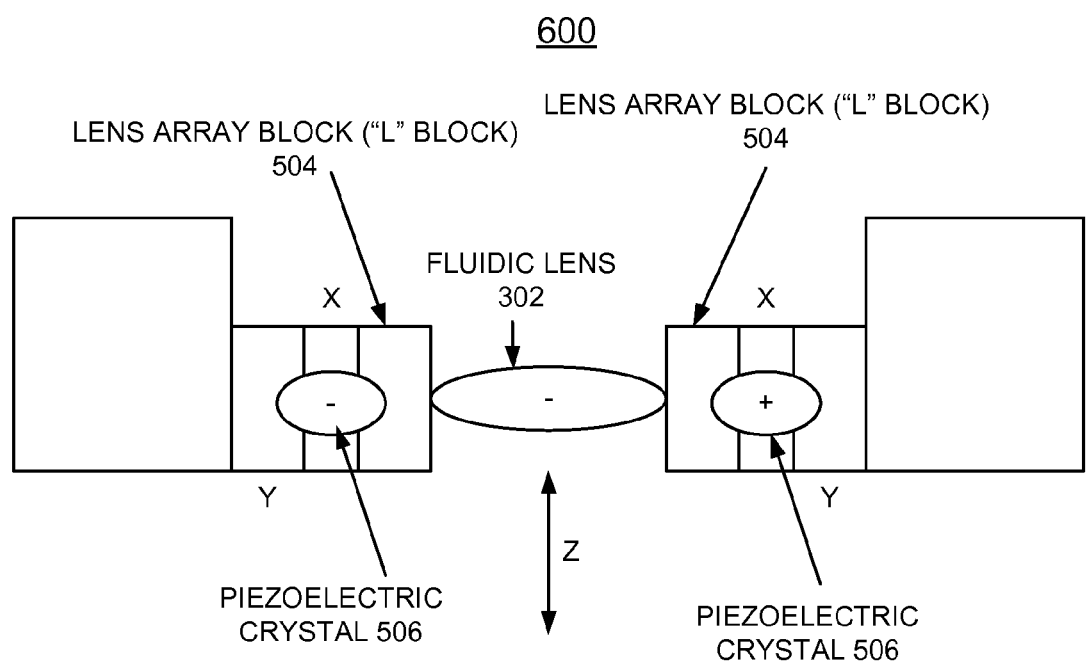
FIG. 6 schematically illustrates not to scale a pair of the L-shaped block lens array of FIG. 5 with a fluidic lens of the fiber optic module assembly of FIG. 3 used with the lens control circuit of FIG. 1 for implementing reduced signal degradation for the fiber optic modules in accordance with the preferred embodiment.

FIG. 5 illustrates one half of a lens array generally designated by the reference character 500 in accordance with the preferred embodiment. A level platform 502 supports a lens array block 504 represented by an L-shaped array block 504. A minor image of the lens array 504 is located on an opposite side of the fluidic lens 302 (not shown in FIG. 5), for example, as shown in FIG. 6. Z-axis focus of the fluidic lens 302 is controlled by applying a selected voltage potential to the fluidic lens 302.

A plurality of piezoelectric crystals 506 is mounted to front and side faces of the lens array block 504 to control horizontal and vertical alignment (x-axis and y-axis) of respective fluidic lens 302, for example, as shown in FIG. 6.

FIG. 6 illustrates a pair of the L-shaped lens array blocks 504 of FIG. 5 with a fluidic lens 302 of the fiber optic module assembly 300 of FIG. 3 used with the lens control circuit 100 of FIG. 1 for implementing reduced signal degradation for the fiber optic modules in accordance with the preferred embodiment. An array of fluidic lens 302 is provided with a lens assembly 600 including a lens array block 504. For example, an array of 128 optical modules can be used for a particular application. A single optical module 300 used for an application is 2.45×3 mm in size.

As illustrated in FIGS. 5 and 6, x-axis and y-axis alignment are provided by the plurality of piezoelectric crystals 506 mounted to the lens array blocks 504, controlling horizontal and vertical alignment (x-axis and y-axis) of respective fluidic lens 302. For example, current applied to the piezoelectric crystals 506 mounted on the front face of the L-shaped block 504 controls the alignment of the vertical or y-axis and current applied to the piezoelectric crystals 506 mounted on the side of the L-shaped block 504 controls the alignment of the horizontal or x-axis. Each of the piezoelectric crystals 506 mounted to front and side faces of the lens array block 504 is capable of independent movement or concerted movement, as required, to correct misalignment.

For example, in FIG. 6, if the fluidic lens 302 needs to move along the right x-axis, then the left side piezoelectric crystal 506 expands to push the array in the proper direction while the right side piezoelectric crystal 506 contracts.

FIGS. 7A, 7B, 7C, 7D, and 7E illustrate the fluidic lens 302 of the fiber optic module assembly 300 of FIG. 3 used with the lens control circuit 100 of FIG. 1 for implementing reduced signal degradation in accordance with the preferred embodiment. The fluidic lens 302 is a variable-focus lens 302, for example, having no mechanical moving parts. The fluidic lens 302 provides variable lens shape responsive to the selected voltage potential being applied to a pair of housing electrodes 702, 704 provided with a housing glass portion 706, and a housing insulator portion 708 of the fluidic lens 302.

A lens mechanism of the fluidic lens 302 applies a corresponding electric field changing the shape of the lens responsive to the applied selected voltage potential. The fluid lens alters its focal length by changing its shape. The fluidic lens 302 includes two immiscible (non-mixing) fluids 712, 714 of different refractive index (optical properties), one fluid 712 an electrically conducting aqueous solution and the other fluid 714 an electrically non-conducting oil, contained within housing glass transparent end caps 706. The internal surfaces of the housing sidewalls and one of its end caps 706 are coated with a hydrophobic (water-repellent) coating 716 that causes the aqueous solution to form itself into a hemispherical mass at the housing opposite end 718, where it acts as a spherically curved lens.

Figure 7A:
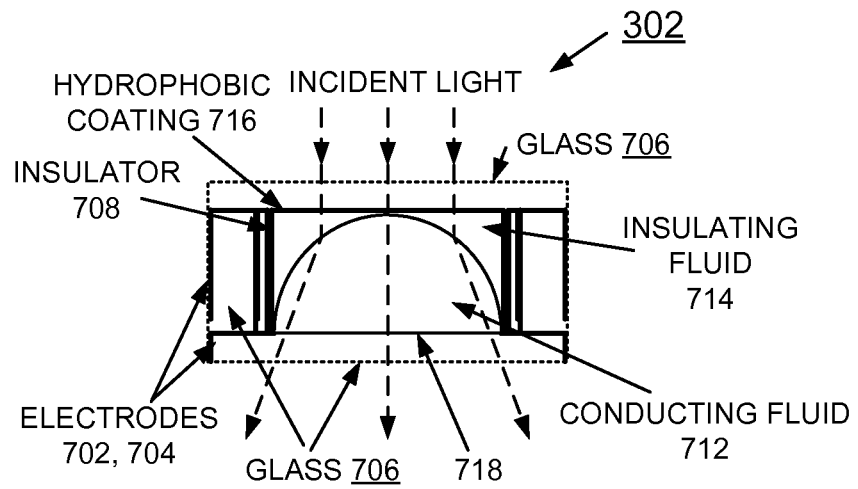
FIGS. 7A, 7B, 7C, 7D, and 7E schematically illustrate not to scale the fluidic lens of the fiber optic module assembly of FIG. 3 used with the lens control circuit of FIG. 1 for implementing reduced signal degradation for the fiber optic modules in accordance with the preferred embodiment.
Figure 7B:
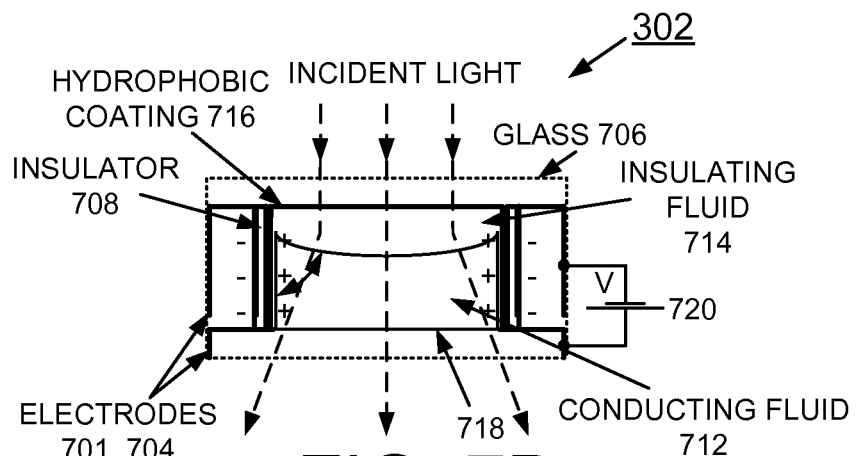

As illustrated in FIG. 7B, a voltage V is applied by a voltage supply 720. The shape of the lens 302 is adjusted by applying an electric field across the hydrophobic coating 716 such that it becomes less hydrophobic by a process called electro-wetting that results from an electrically induced change in surface tension. As a result of this change in surface-tension the aqueous solution begins to wet the sidewalls of the tube, altering the radius of curvature of the meniscus between the two fluids and hence the focal length of the lens.

Figure 7C:
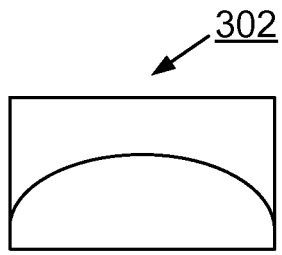
Figure 7D:
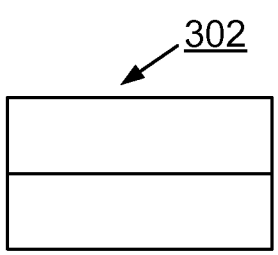
Figure 7E:
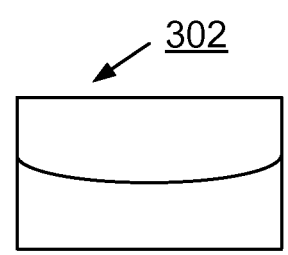

Referring now to FIGS. 7C, 7D, and 7E, by increasing the applied electric field the surface of the initially convex lens can be made completely flat with no lens effect, or concave. As a result it is possible to implement lenses that transition smoothly from being convergent to divergent and back again.

The fluidic lens 302 can be implemented with a fluidic lens called the Philips FluidFocus lens, developed and manufactured by Philips Research, Philips Electronics N.V. of the Netherlands, which is described that the fluidic lens mimics the action of the human eye using a fluid lens that alters its focal length by changing its shape. The fluidic lens, which lends itself to high volume manufacturing, overcomes the fixed-focus disadvantages of many of today's low-cost imaging systems.

Figure 8:
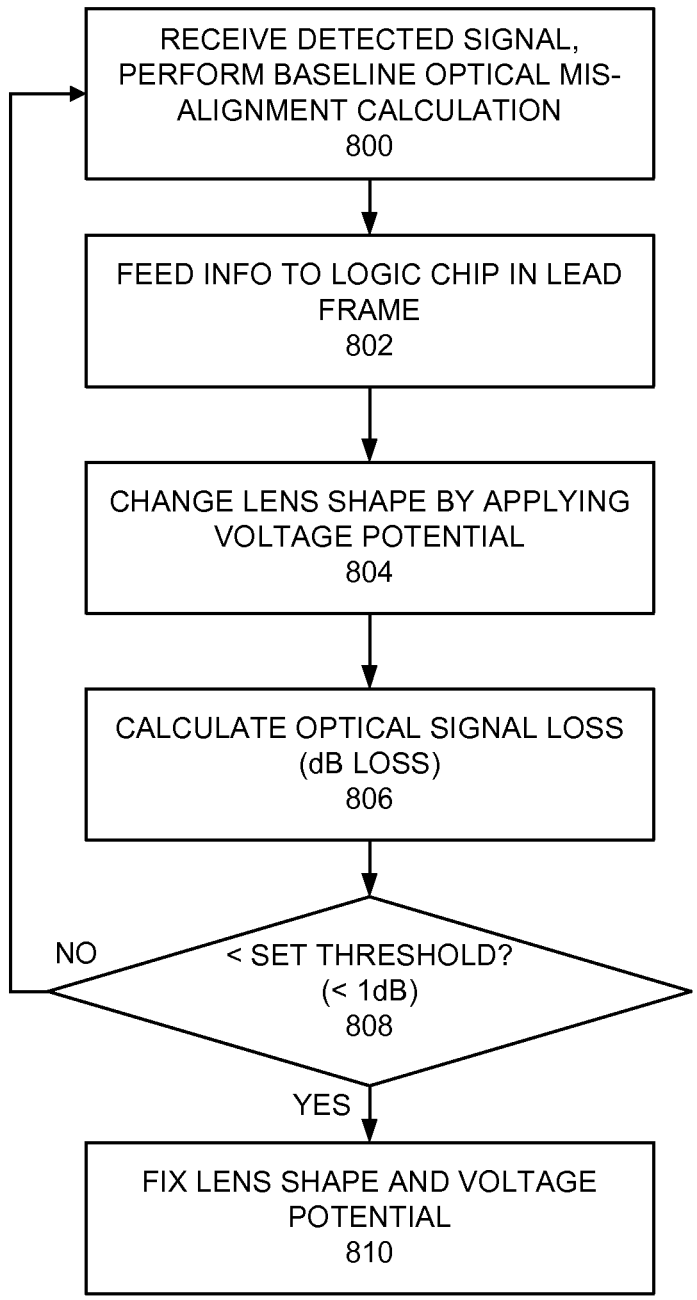
FIG. 8 is a flow chart illustrating exemplary steps performed by the lens control circuit of FIG. 1 for implementing reduced signal degradation for fiber optic modules in accordance with the preferred embodiment.

FIG. 8 is a flow chart illustrating exemplary steps performed by the lens control circuit 100 of FIG. 1 for implementing reduced signal degradation for fiber optic modules 300 in accordance with the preferred embodiment. A detected signal input by the detector 104 is received and a baseline optical misalignment calculation is performed as indicated at a block 800. As indicated at a block 802, the information is applied to the lens control logic 102 contained in the lead frame 320. A voltage potential for a lens shape control is selected responsive to the optical misalignment calculation to change the lens shape as indicated at a block 804. An optical signal loss or dB loss is calculated as indicated at a block 806 and threshold compare is performed as indicated at a decision block 808, for example, to determine if the optical signal loss calculation is less than the threshold value of 1 dB. Responsive to the optical signal loss calculation less than the predetermined threshold, the lens shape and voltage potential are fixed as indicated at a block 810. Otherwise when the optical signal loss calculation is not less than the predetermined threshold, the functional steps are repeated returning to block 800 to receive another detected signal, and continue until the signal width is within specification.

Figure 9:
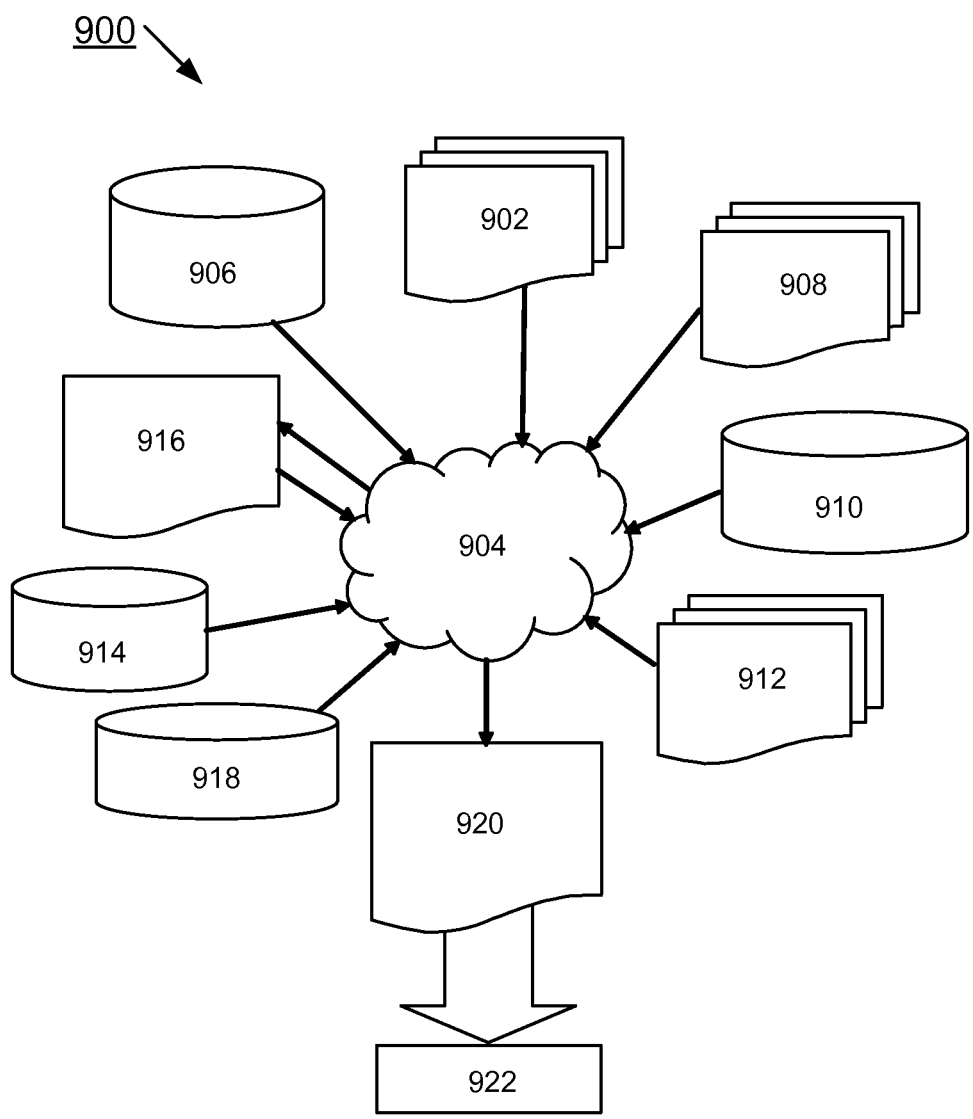
FIG. 9 is a flow diagram of a design process used in semiconductor design, manufacturing, and/or test.

FIG. 9 shows a block diagram of an example design flow 900. Design flow 900 may vary depending on the type of IC being designed. For example, a design flow 900 for building an application specific IC (ASIC) may differ from a design flow 900 for designing a standard component. Design structure 902 is preferably an input to a design process 904 and may come from an IP provider, a core developer, or other design company or may be generated by the operator of the design flow, or from other sources. Design structure 902 comprises circuits 100, 300 in the form of schematics or HDL, a hardware-description language, for example, Verilog, VHDL, C, and the like. Design structure 902 may be contained on one or more machine readable medium. For example, design structure 902 may be a text file or a graphical representation of circuits 100, 300. Design process 904 preferably synthesizes, or translates, circuits 100, 300 into a netlist 906, where netlist 906 is, for example, a list of wires, transistors, logic gates, control circuits, I/O, models, etc. that describes the connections to other elements and circuits in an integrated circuit design and recorded on at least one of machine readable medium. This may be an iterative process in which netlist 906 is resynthesized one or more times depending on design specifications and parameters for the circuits.

Design process 904 may include using a variety of inputs; for example, inputs from library elements 908 which may house a set of commonly used elements, circuits, and devices, including models, layouts, and symbolic representations, for a given manufacturing technology, such as different technology nodes, 32 nm, 45 nm, 90 nm, and the like, design specifications 910, characterization data 912, verification data 914, design rules 916, and test data files 918, which may include test patterns and other testing information. Design process 904 may further include, for example, standard circuit design processes such as timing analysis, verification, design rule checking, place and route operations, and the like. One of ordinary skill in the art of integrated circuit design can appreciate the extent of possible electronic design automation tools and applications used in design process 904 without deviating from the scope and spirit of the invention. The design structure of the invention is not limited to any specific design flow.

Design process 904 preferably translates an embodiment of the invention as shown in FIGS. 1, 3 along with any additional integrated circuit design or data (if applicable), into a second design structure 920. Design structure 920 resides on a storage medium in a data format used for the exchange of layout data of integrated circuits, for example, information stored in a GDSII (GDS2), GL1, OASIS, or any other suitable format for storing such design structures. Design structure 920 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 3. Design structure 920 may then proceed to a stage 922 where, for example, design structure 920 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing reduced signal degradation for fiber optic modules comprising:
providing a fluidic lens in a fiber optic module; said fluidic lens having a variable lens shape responsive to an applied selected voltage potential;
providing a detector with a fluidic lens control circuit coupled to said fluidic lens;
receiving from said detector a detected signal input,
performing a baseline optical misalignment calculation responsive to the detected signal input;
controlling alignment of horizontal and vertical positions of said fluidic lens;
changing fluidic lens shape by selecting and applying a voltage potential to said fluidic lens responsive to the baseline optical misalignment calculation;
performing an optical signal loss calculation and threshold compare for identifying an optical signal loss calculation less than a set threshold value; and
responsive to the optical signal loss calculation being less than the set threshold value, fixing the fluidic lens shape and voltage potential for the fluidic lens shape control in the fiber optic module.

2. The method for implementing reduced signal degradation as recited in claim 1 includes responsive to the optical signal loss calculation being greater than the set threshold value, receiving another detected signal input and performing another baseline optical misalignment calculation.

3. The method for implementing reduced signal degradation as recited in claim 2 includes selecting said voltage potential for said fluidic lens shape control, responsive to the optical misalignment calculation.

4. The method for implementing reduced signal degradation as recited in claim 1 wherein providing said fluidic lens in said fiber optic module includes providing a photosensitive detector with an aperture upon a semiconductor laser; and wherein receiving a detected signal input includes receiving a detected signal input from said photosensitive detector.

5. The method for implementing reduced signal degradation as recited in claim 4 wherein said semiconductor laser includes a Vertical-Cavity Surface-Emitting Laser (VCSEL).

6. The method for implementing reduced signal degradation as recited in claim 1 wherein providing said fluidic lens in said fiber optic module includes providing said fluidic lens with a pair of housing electrodes, and wherein said fluidic lens provides a variable fluidic lens shape responsive to the selected voltage potential being applied to said pair of housing electrodes of said fluidic lens.

7. The method for implementing reduced signal degradation as recited in claim 1 wherein providing said fluidic lens in said fiber optic module includes providing said fluidic lens with a lens mechanism, and using said lens mechanism of said fluidic lens responsive to the applied selected voltage potential, for applying a corresponding electric field to change the shape of said fluidic lens.

8. The method for implementing reduced signal degradation as recited in claim 1 includes providing an array of fluidic lens with a fluidic lens assembly.

9. The method for implementing reduced signal degradation as recited in claim 1 includes providing a lens array block with an array of said fluidic lens, and mounting a plurality of piezoelectric crystals onto said lens array block for controlling alignment of horizontal and vertical position of said array of said fluidic lens.

10. The method for implementing reduced signal degradation as recited in claim 9 includes selectively applying current to said piezoelectric crystals to control alignment of respective fluidic lens.

11. The method for implementing reduced signal degradation as recited in claim 1 wherein performing an optical signal loss calculation and threshold compare includes comparing the calculated optical signal loss with a selected threshold value, and wherein said selected threshold value is approximately 1 dB.

12. A lens control circuit for implementing reduced signal degradation for fiber optic modules comprising:
   a fluidic lens in a fiber optic module; said fluidic lens having a variable lens shape responsive to an applied selected voltage potential;
   a detector coupled to said fluidic lens;
   a baseline optical misalignment calculation block receiving a detected signal input from said detector and calculating an optical misalignment;
   a fluidic lens assembly controlling alignment of horizontal and vertical position of said fluidic lens;
   a voltage potential selection block for a fluidic lens shape control changing fluidic lens shape by selecting and applying a voltage potential to said fluidic lens responsive to the calculated optical misalignment of the baseline optical misalignment calculation block; and
   an optical signal loss calculation and threshold compare block for identifying an optical signal loss calculation less than a set threshold value; said optical signal loss calculation and threshold compare block fixing a lens shape and voltage potential for the lens shape control responsive to the optical signal loss calculation being less than the set threshold value in the fiber optic.

13. The lens control circuit for implementing reduced signal degradation as recited in claim 12 includes said optical signal loss calculation and threshold compare block responsive to the optical signal loss calculation being greater than the set threshold value, receiving another detected signal input and performing another baseline optical misalignment calculation.

14. The lens control circuit for implementing reduced signal degradation as recited in claim 12 wherein said detector includes a photosensitive detector with an aperture mounted upon a semiconductor laser; and said photosensitive detector applying the detected signal input to said optical misalignment calculation block.

15. The lens control circuit for implementing reduced signal degradation as recited in claim 14 wherein said semiconductor laser includes a Vertical-Cavity Surface-Emitting Laser (VCSEL).

16. The lens control circuit for implementing reduced signal degradation as recited in claim 12 wherein said fluidic lens includes said fluidic lens with a pair of housing electrodes, and wherein said fluidic lens provides a variable fluidic lens shape responsive to the selected voltage potential being applied to said pair of housing electrodes of said fluidic lens.

17. The lens control circuit for implementing reduced signal degradation as recited in claim 12 wherein said fluidic lens includes said fluidic lens with a lens mechanism, and using said lens mechanism of said fluidic lens responsive to the applied selected voltage potential, for applying a corresponding electric field to change the shape of said fluidic lens.

18. The lens control circuit for implementing reduced signal degradation as recited in claim 12 includes an array of said fluidic lens with said fluidic lens assembly.

19. The lens control circuit for implementing reduced signal degradation as recited in claim 18 wherein said fluidic lens assembly includes a lens array block coupled to said array of said fluidic lens, and a plurality of piezoelectric crystals mounted onto said lens array block to control alignment of respective fluidic lens.

20. The lens control circuit for implementing reduced signal degradation as recited in claim 12 wherein said optical signal loss calculation and threshold compare block includes logic for comparing the calculated optical signal loss with a selected threshold value, and wherein said selected threshold value is approximately 1 dB.

21. A design structure embodied in a non-transitory machine readable medium used in a design process, the design structure comprising:
   a circuit schematic for a circuit, the circuit schematic tangibly embodied in the non-transitory machine readable medium used in the design process, said circuit for implementing reduced signal degradation for fiber optic modules, said circuit schematic comprising:
   a fluidic lens in a fiber optic module; said fluidic lens having a variable lens shape responsive to an applied selected voltage potential;
   a detector coupled to said fluidic lens;
   a baseline optical misalignment calculation block receiving a detected signal input from said detector and calculating an optical misalignment;
   a fluidic lens assembly controlling alignment of horizontal and vertical position of said fluidic lens;
   a voltage potential selection block for a fluidic lens shape control changing fluidic lens shape by selecting and applying a voltage potential to said fluidic lens responsive to the calculated optical misalignment of the baseline optical misalignment calculation block; and
   an optical signal loss calculation and threshold compare block for identifying an optical signal loss calculation less than a set threshold value; said optical signal loss calculation and threshold compare block fixing a fluidic lens shape and voltage potential for the fluidic lens shape control responsive to the optical signal loss calculation being less than the set threshold value in the fiber optic module; wherein the design structure, when read and used in the manufacture of a semiconductor chip produces a chip comprising said circuit schematic.

22. The design structure of claim 21, wherein the design structure comprises a netlist, which describes said circuit schematic.

23. The design structure of claim 21, wherein the design structure resides on storage medium as a data format used for the exchange of layout data of integrated circuits.

24. The design structure of claim 21, wherein the design structure includes at least one of test data files, characterization data, verification data, or design specifications.

* * * * *